United States Patent [19]
Heyworth

[11] 3,813,064
[45] May 28, 1974

[54] VISUAL RUNWAY DISTANCE MARKER

[76] Inventor: Eugene R. Heyworth, 3705 W. 84 Ave., Anchorage, Alaska 99502

[22] Filed: Apr. 21, 1972

[21] Appl. No.: 246,254

[52] U.S. Cl............................ 244/114 R, 116/63 P
[51] Int. Cl................................................. B64f 1/18
[58] Field of Search ... 244/114 R; 40/125 A, 125 F, 40/125 H, 125 N, 125 K, 125 R, 130 R; 116/28, 63 R, 63 P; 240/1.2; 404/6, 9; 340/25-28

[56] References Cited
UNITED STATES PATENTS

| | | | |
|---|---|---|---|
| 2,800,099 | 7/1957 | Baker | 40/125 N X |
| 2,887,930 | 5/1959 | Zoffmann | 116/63 P X |
| 2,961,786 | 11/1960 | Lowmaster | 40/125 H |
| 3,157,374 | 11/1964 | Conrey | 244/114 R |
| 3,233,352 | 2/1966 | Projector et al. | 240/1.2 X |
| 3,449,848 | 6/1969 | Howell | 40/125 R |
| 3,685,666 | 8/1972 | Rose | 40/125 H X |

FOREIGN PATENTS OR APPLICATIONS

| | | | |
|---|---|---|---|
| 600,316 | 11/1959 | Italy | 116/63 P |

Primary Examiner—Trygve M. Blix
Assistant Examiner—Paul E. Sauberer
Attorney, Agent, or Firm—Benner & Wray

[57] ABSTRACT

The remaining distance on a runway is indicated by large numerals indicating hundreds or thousands of feet remaining to the end of the runway. The distance markers inform the pilot taking off of the remaining distance to the end of the runway so that the pilot may know whether an aborted takeoff is possible and so that the pilot of a landing aircraft may calculate necessary braking action to stop the aircraft short of the runway end. The marker is constructed of a readily collapsible aluminum angle frame having a triangular base pyramid form. The apex of the pyramid is positioned directly over a standard runway light. Anchors at vertices of the base provide easy anchoring independent of the lighting system. A translucent plate covers one triangular side and is held in place by a triangular retainer made of angle aluminum pieces which fit over corresponding pieces in the frame. A large opaque number is positioned centrally on the plate.

8 Claims, 3 Drawing Figures

PATENTED MAY 28 1974 3,813,064

VISUAL RUNWAY DISTANCE MARKER

BACKGROUND OF THE INVENTION

Serious aircraft accidents have been caused by lack of complete and immediate information to pilots concerning positions of aircraft on runways and especially concerning the amount of runway remaining until the end in the direction of aircraft travel. Knowledge of the length of the remaining runway is imperative for good safety during takeoff and during landing.

In takeoff procedures there are two important reasons why a pilot must know the distance to the end of the runway in the direction of aircraft travel. All aircraft have minimum runway lengths which are usable under conditions of loading. It is important that a pilot be apprised of the runway length or the length of runway between his position and the distant end in the direction of aircraft travel so that the pilot may know whether the runway length is sufficient to meet minimum takeoff requirements.

During the takeoff acceleration, it is sometimes necessary or desirable to abort a takeoff. Control failures or power losses or indications of such failures or losses may suggest danger in a continued takeoff. At varied increments of velocity each aircraft has a safe stopping distance according to loading and runway surface characteristics. It is important at all times during takeoff that a pilot know his exact position on the runway so that he can quickly consider the speed of the aircraft and the factors of weight and runway conditions in deciding whether there is sufficient distance left for aborted takeoff procedures. Bad accidents have recently been caused by pilots' believing there to be more runway remaining than was actually remaining at the beginning of their takeoff aborting procedures.

In landing an aircraft, especially in periods of low visibility, it is sometimes difficult for a pilot to tell exactly where the touchdown point was on a runway strip. Thus, the pilot may not know the distance remaining on the runway. Often, emergency braking procedures will bring the craft to a rapid and safe stop even though passenger discomfort and slight equipment damage may result. A pilot is hesitant to use those procedures of fast stopping unless he is absolutely sure that such procedures are required. In low visibility conditions, when a pilot flies over the end of the runway and does not see the touchdown end and cannot see the distant end, under present conditions he has no reference to indicate the remaining distance to the end of the runway.

There is a great need both in takeoff procedures and in landing procedures to have the actual distance remaining on a runway marked and readily visibly accessible to a pilot.

Some runway marking devices have been proposed. However, due to complexities of the structure of those devices and due to their high equipment and installation costs, the devices have not been used. However, it is extremely important that any device erected along a runway be readily collapsible so as not to present an unnecessary danger to aircraft using the runway. Marking devices which have been collapsible have been so expensive to construct and to use as to make them of little value for widespread and intensive use on runways.

Marking devices have been proposed to indicate by illumination particular sections of runways. Such devices have suggested the use of varied colored lighting creating cones of light colors which indicate position on a runway. Such systems have been expensive to install, confusing in their use and incapable of equal use in opposite senses of direction such as required by wind changes.

SUMMARY OF THE INVENTION

The present invention is a low cost, easily constructed, installed and maintained runway marking device for indicating distance remaining to an end of a runway in the direction of aircraft travel. Preferably the marker is a lightweight open frame which fits over a runway light and which is enclosed by plates only where necessary to support the indicia. The lightweight and open nature of the frame has several important advantages. First, it places a minimum of materials near the runway, minimizing obstructions in the event that an aircraft runs off a runway. Second, the openness of the frame provides maximum light output from the runway light which is surrounded by the marker. Placing the marker over the light is desirable so that the indicia are illuminated in darkness and in cases of reduced visibility. Moreover, the pilot's attention is drawn to illuminated devices. The open nature of the frame makes the marker inexpensive and light to ship and provides ready access for replacing bulbs in the runway lights as necessary.

Preferably, the markers are positioned every five hundred or one thousand feet along the entire length of the runway at positions of precise measurement so that a pilot knows exactly how many feet are remaining. For example, 9,500 feet would be marked with a large nine and a small five, and 9,000 feet would be marked with simply a large nine. If a runway is precisely a number of thousand feet long when thousand foot markers are used or if the runway length is exactly divisible by 500 feet when 500 foot markers are used, markers may be two-sided, so that they are readable from either direction of travel along the runway. Except at the middle of the runway the numbers on opposite sides of the marker are different according to the precise distance remaining in one direction of travel.

When standard runway lights are positioned at 200 foot intervals, markers may be placed upon every fifth light to denote 1,000 foot intervals. Alternately, markers may be placed on every light with an indication of hundreds of feet remaining. Intersections where the light sequence is interrupted are accounted for in the displayed numerals.

It is highly desirable that the pilot know the exact number of feet remaining and that the markers be accurately positioned at precise intervals along the runway. One recent aircraft accident involving loss of life and limb could have been avoided if a pilot knew that a runway was only 9,000 feet long rather than 9,000, 500 feet long as he had been given to assume.

It is preferable to use markers which have indicia on single sides. In that embodiment, the openness of the markers is further significant since runway lights are clearly visible through the open rear of the markers to aircraft approaching from the opposite direction, obviating the possibility of confusion of opposite facing markers with markers facing in a pilot's direction. Runway light illumination is diffused on one side in a preferred embodiment to evenly illuminate the plate without glare.

Markers may be constructed of aluminum, plexiglass, plastic and fiberglass and other substances. In a preferred form of the invention, indicia-bearing faces on markers have highly reflective borders so that a pilot's attention will be directed to the markers when an aircraft is operating with landing lights.

In some applications of the invention, it is desirable to use the markers only during the last 5,000 feet of runway. When proceeding down a runway the first marker that a pilot sees will carry the numeral 5, and the second marker may carry the numeral 4.5 or 4, according to the interval between markers.

In one embodiment of the invention, the frame is constructed of lightweight angle pieces. The indicia carrying side may be a translucent plastic sign face of a size commensurate with a side of the frame. Fasteners attach the sign face to the side. For example, the fasteners may be metal screws inserted through holes in the sign face. Preferably, a retainer frame is fitted around the sign face and is fitted over corresponding pieces of the main frame, and the retainer is fastened to the main frame so that the life of the plastic sign face is prolonged. A reflective coating is added around the edge of the sign face to draw attention to the sign. In one embodiment, the reflective coating may be reflective tape which is self-adhesive to the sign face and the retainer.

In a preferred embodiment, anchoring means are feet which extend outward from corners of the base. Thus the feet are connected to the base adjacent the connections of the side pieces, augmenting durability of the sign. The feet are light metallic plates which extend outward and which have an opening for an anchor device. In one form of the invention, the anchor device may be a large lag bolt which is turned into the compacted runway apron. Where necessary the ground may be prepared simply by grouting, or a concrete base may be poured.

In one embodiment of the invention the marker is constructed as a triangular base pyramid. The base is made up of three pieces of aluminum angle, for example 24T3 or the equivalent, 0.051 inches thick. Each piece has flanges 1½ inches wide and has a length of 24 inches. The flanges are bent to a 60° angle. A suitable extrusion may be used. The aluminum pieces are joined together at their ends to form a triangle with a flat bottom and upward and inward sloping flanges. Three 24-inch side pieces are joined together at first ends in an apex. Second ends of the side pieces are joined to intersections of the base pieces. Each side piece has 1-inch wide flanges bent at 60°. In the example, except for the width of the flanges, the side pieces and the base pieces are made of similar stock. When the side pieces are joined together, the flanges are arranged so that they form the borders of flat triangular bases.

An indicia-bearing sign face in an example is made of translucent plastic approximately one-sixteenth inch thick with 24-inch edges in the form of an equilateral triangle. A numeral is stenciled on the face, or a self-adhesive numeral such as those used in aircraft registration numbers of a size approximately 8 inches by 10 inches may be adhered to the face. In a preferred embodiment, a retainer is formed of aluminum angle having 1 inch and ½ inch flanges bent at 60° and being constructed of material of a weight and quality equivalent to those of the sides and base. Three similar pieces are joined at the ends in a triangular shape and the retainer is placed over the sign face and then over corresponding pieces of the sides and base.

The apparatus of the present invention has the advantages of quick and low cost installation and rapid and low cost production. The markers are movable and reusable, and the parts are interchangeable. The markers are economical and are lighted by conventional and available runway lights. The distinctive shape of the markers makes them readily identifiable and provides proper viewing angles for pilots in aircraft. Their simple construction and lightweight is important in the economics of production, shipping and installation. Their easy crushability makes them safe for use close to the runway. Although the markers are readily crushable and are light, their unique design provides a sturdiness. The open side construction makes the runway lights readily visible from the opposite direction and facilitates servicing of the runway lights. The markers are attractive and distinctive and provide universal recognition of their nature and meaning. Triangular signs are recognized as having information on particular cautions. Preferably the marker frames are stacked and shipped in sets with the faces installed. Upon receiving the markers the airport maintenance crew simply measures 1,000 feet from the end of the runway and installs markers with the number 1 on both sides of the runway over the closest runway lights. Additional thousand feet or increments of 500 feet are measured, and the appropriate markers are placed. Alternatively, the indicia bearing plates may be shipped independently of the frames, and the appropriate plates may be joined with the frames before or after installation of the frames at the airport.

Although large billboard type distance signs have been used by the Air Force at points remote from the runway, such signs are not readily available to the pilot's peripheral vision, and the pilot's attention is not drawn to such signs. The present markers are positioned and angled to promote readily discernible information within the pilot's peripheral vision by devices which inherently promote observation.

One object of the invention is the provision of a distance marking system for identifying remaining length of a runway.

Another object of the invention is the provision of a safe and inexpensive runway edge remaining distance marker.

This invention has as another object the provisions of an open frame, three-dimensional distance marker for positioning over a runway light.

A further object of the invention is the provision of runway distance markers having indicia on faces which are mounted in visibly accessible positions.

Another object of the invention is the provision of an open frame triangular base pyramid runway marker with a triangular face sloped inward toward a runway and upwardly toward an aircraft with distance indicia on the face.

Another object of the invention is the provision of a readily collapsible aluminum frame distance marker for positioning adjacent a runway edge.

These and other objects of the invention are apparent in the disclosure which includes the foregoing and ongoing specification and claims and the drawings.

DETAILED DESCRIPTION OF THE DRAWINGS

Figure 1:
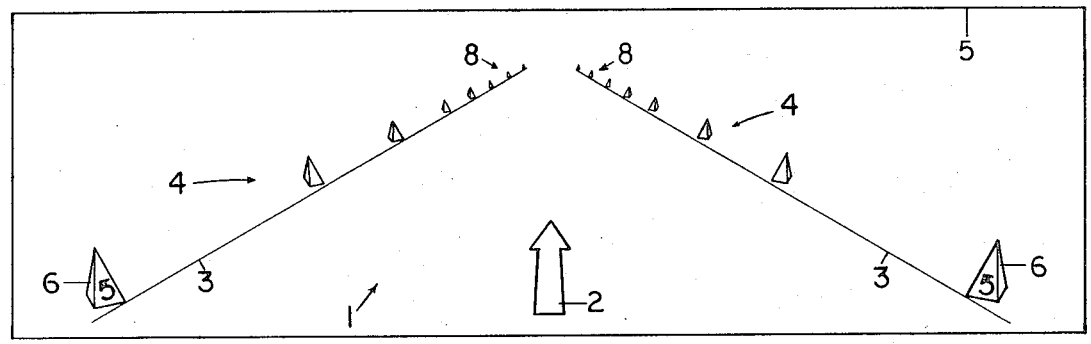
FIG. 1 is a pilot's view of runway distance markers according to the present invention.

Referring to FIG. 1, a runway is generally indicated by the numeral 1. An aircraft is moving along the runway in a direction shown by arrow 2. Along opposite edges 3 of runway 1, distance markers generally indicated by the numeral 4 are positioned every 1,000 feet or 500 feet along the runway. A pilot proceeding along the runway views the runway 1 and marker 4 through the window 5 in an example as depicted. The proximate markers 6 have the large numeral five, which indicate that as the aircraft draws abreast of markers 6, it will be 5,000 feet from the distant end of the runway. The next pair of markers may carry large numeral four's and small five's, indicating that the next position has 4,500 feet remaining to the end of the runway. The distant markers generally indicated by the numeral 8 show successively smaller distances remaining to the end of the runway. Thus, a pilot, upon peripherally viewing the markers, is apprised of the exact distance remaining to the end of the runway. Knowing the speed, or approximate speed of his aircraft, its loading and runway conditions, the pilot knows when he has passed the point of a safe takeoff aborting or knows how much braking is necessary during a landing runout.

Figure 2:
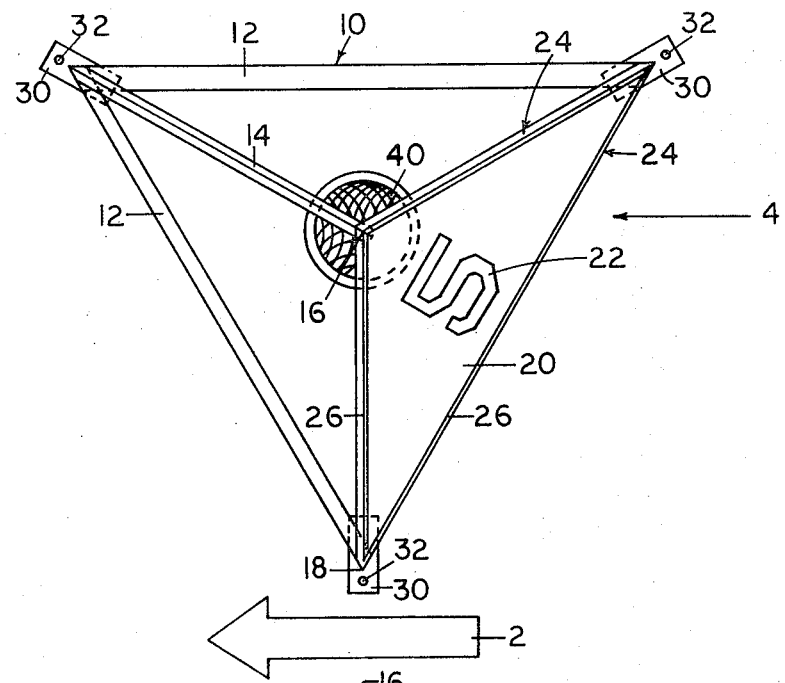
FIG. 2 is a plan view of a marker constructed according to the invention.
Figure 3:
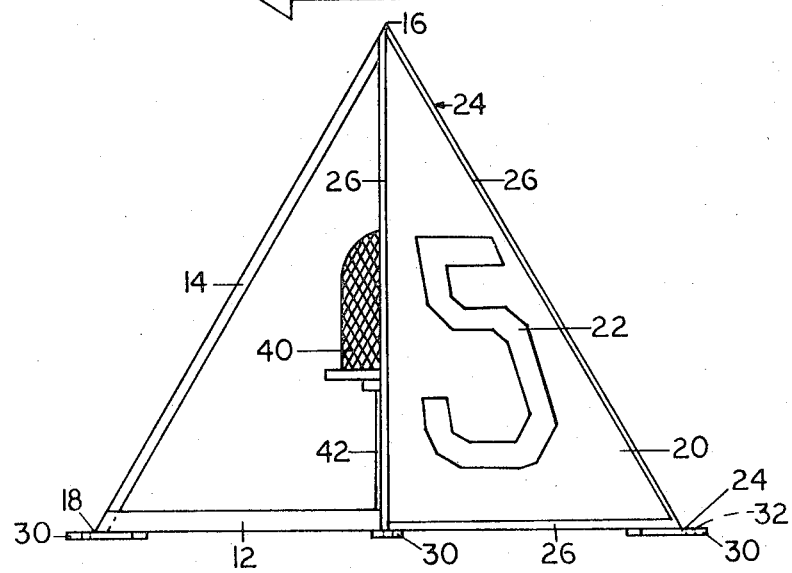
FIG. 3 is a side elevation of a marker, showing a runway light partially exposed.

In the preferred form of the invention shown in FIGS. 2 and 3, marker 4 has a triangular base 10 formed of aluminum angle pieces 12 with flanges at 60° angles. Sides are formed of aluminum angle pieces having flanges at 60° angles. The side pieces 14 are joined at the top in an apex 16. Lower ends of the side pieces are joined such as by welding to inner sections 18 of faces 12. A triangular translucent plate 20 is positioned over the flanges of two side pieces and a base piece. A large numeral, in this case a 5, appears centered on the face plate 20.

A retainer, generally indicated by the numeral 24, and formed of three end joined aluminum angle pieces, is placed over the translucent plate 20 and the frame members. Flanges of the individual pieces 26 in retainer 24 may be bent around corresponding frame members to securely fasten plate 20 to the sign frame. Other fasteners, for example metal screws or clips, may be added. Preferably, the lower flange of the bottom retaining element 26 is cut away at its ends so that the ends do not interfere with the ground mounting feet 30. As shown in the drawings, the ground mounting feet 30 are attached to the frame member and particularly to base pieces 12 at their intersections. The anchor means or feet 30 extend outward. Holes 32 near their extremities receive lag bolts, spikes or other anchoring devices which hold the frame to the ground around the runway light 40.

As shown in FIGS. 2 and 3, runway light 40, which is supported on stand 42, is completely visible from the direction opposite to arrow 2. Moreover, the runway light 40 is available for servicing, such as replacement of a bulb.

While the invention has been described with specific reference to one or more embodiments, it will be obvious that modifications of the present invention and other embodiments may be constructed using the teaching of the present invention. The precise scope of the invention is defined only in the following claims.

I claim:

1. Airfield runway marker comprising a one piece frame having a rigid triangular base having a soft easily collapsible construction and having a one piece rigid three-dimensional skeleton frame extending upward from the base and inward, forming a pyramid with triangular sides rigidly joined together at a top, and one of the sides supporting a large numeral extending over a substantial portion of a side from the top to the base, and rigid anchor means fixed to the base and extending rigidly laterally outward from the base adjacent junctions of the base and the sides, a similarly shaped triangular translucent plate positioned adjacent one side of the frame with a large numeral fixed on the plate, and a retainer formed of metallic angle pieces rigidly joined at ends thereof to form a similar triangle and being fitted over edges of the plate and being fitted over adjacent peripheral frame members of the sides and base, thereby fastening the plate on the frame sides.

2. The apparatus of claim 1 wherein the frame is constructed of soft metal angular shapes having equal longitudinal dimensions, the shapes being joined end to end in triangular relationship, thereby forming a pyramid-like open frame having triangular sides and a triangular base.

3. The apparatus of claim 1 wherein the marker is an open frame pyramid having an open triangular base formed of peripheral frame pieces and having triangular sides formed of similar peripheral frame pieces.

4. The apparatus of claim 1 wherein the anchor means comprise substantially flat plates joined to frame intersections and extending outward from apexes of the base.

5. The apparatus of claim 1 wherein two oppositely facing sides of the frame mount numerals which when added together substantially equal the total length of the runway adjacent which the marker is positioned and which when viewed independently indicate the amount of runway remaining in the direction of sight, and wherein a third side of the frame is open.

6. A landing field marker system comprising a plurality of rigid one piece open pyramidal shaped frames having rigid triangular bases, rigid anchors extending outward from the bases, and having rigidly joined triangular sides positioned over fixed runway lights and having similarly shaped translucent plates mounted on the frames adjacent sides of the frames, and retainers formed of metallic angle pieces rigidly joined at ends thereof to form similar triangles and being fitted over edges of the plates and being fitted over adjacent peripheral frame members of the sides and bases, thereby fastening the plates on the frame sides, the plates being readable by aircraft proceeding along a runway, which plates bear large numerical indicia of runway distance remaining in a direction of travel of an aircraft on the runway.

7. The apparatus of claim 6 wherein the frames are anchored to the ground independent of the runway lights around the runway lights.

8. The apparatus of claim 6 wherein the frames comprise readily collapsible frames of similar lightweight angular pieces substantially identical in length and forming equilateral triangular pyramids with triangular bases.

* * * * *